UNITED STATES PATENT OFFICE.

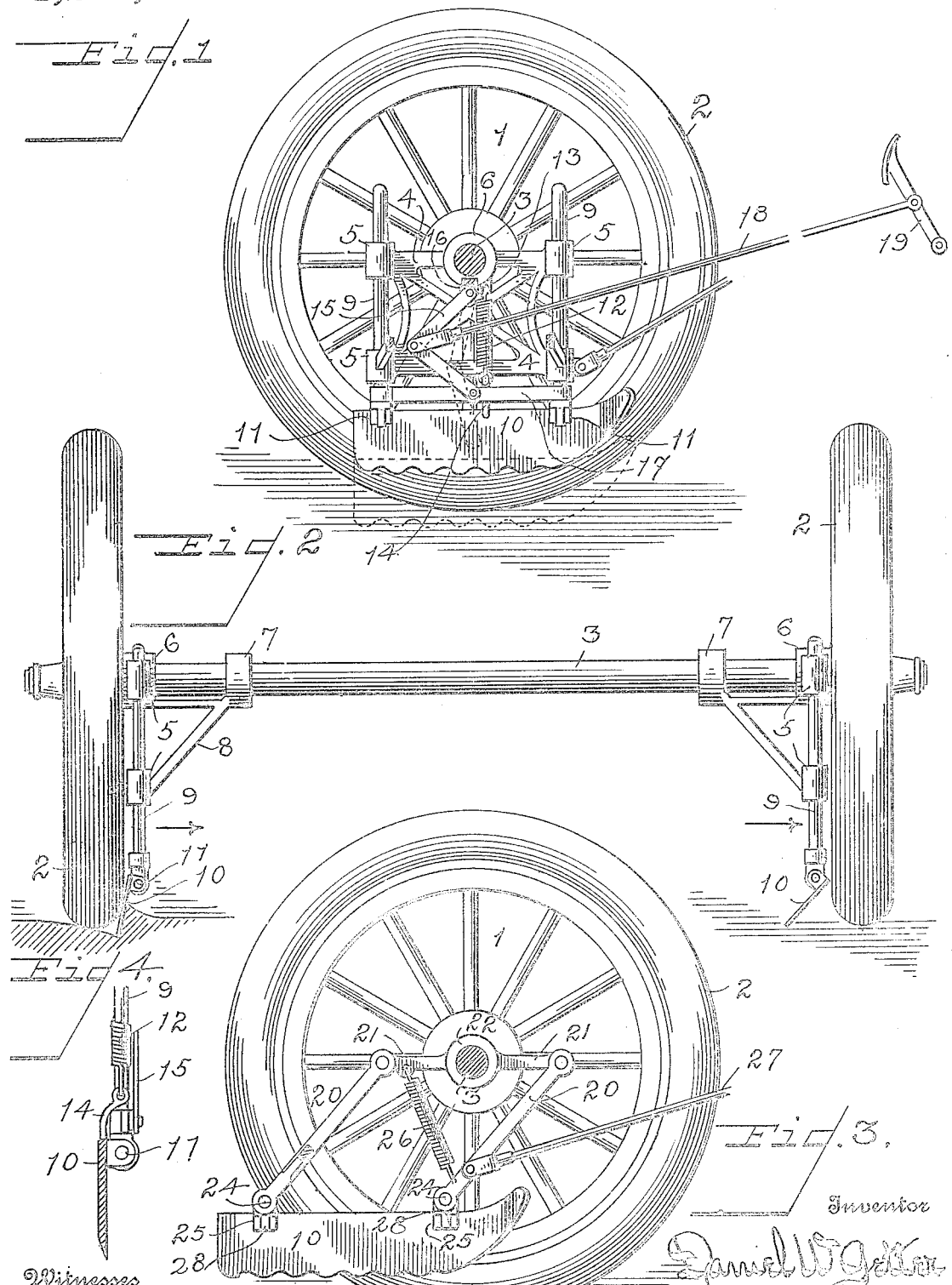

DANIEL W. GETTER, OF DAYTON, OHIO.

ANTISKID DEVICE FOR VEHICLES.

1,235,968.  Specification of Letters Patent.  Patented Aug. 7, 1917.

Application filed February 6, 1913. Serial No. 746,440.

*To all whom it may concern:*

Be it known that I, DANIEL W. GETTER, citizen of the United States, residing at Belmont, Dayton, in the county of Montgomery and State of Ohio, have invented certain new and useful Improvements in Antiskid Devices for Vehicles, of which the following is a specification.

My invention relates to anti skidding devices for vehicles and particularly to that type of devices which are controlled by the driver of the vehicle and which generally comprise a shoe capable of being moved at will into and out of engagement with the road surface.

The object of the invention is to simplify the structure as well as the means and mode of operation of such devices, whereby they will not only be cheapened in construction, but will be more efficient in use, positive in action, readily and quickly adjusted to operative position and unlikely to get out of repair.

With the above primary and other incidental objects in view, as will more fully appear in the specification, the invention consists of the features of construction, the parts and combination thereof and the mode of operation or their equivalents as hereinafter described and set forth in the claims.

Referring to the drawings, Figure 1 is a side elevation of a vehicle wheel viewed from the inner side, to which the anti skidding device, forming the subject matter hereof, has been applied. Fig. 2 is a rear elevation of the drive wheels of a vehicle, showing such device in operative position, with the vehicle tending to skid or slide toward the right as indicated by the arrows. Fig. 3 is a side elevation similar to Fig. 1, illustrating a modification of the construction disclosed in Figs. 1 and 2. Fig. 4 is a detail view of the shoe connections.

Like parts are indicated by similar characters of reference throughout the several views.

Referring to the drawings, 1 is an automobile or other vehicle wheel carrying the usual tire 2 and mounted upon the axle 3. Secured upon the axle 3, adjacent to the wheel, is a frame member 4 carrying vertically disposed bearing sleeves 5 arranged in pairs the sleeves of each pair being in axial alinement, one with the other. The frame member 4 comprises a plurality of arms which connect the bearing sleeve 5, one with the other, and with the supporting hub 6, by which the device is supported upon the axle. The connecting arms of the frame 4 are arranged in such angular relation, one with the other, as to brace the structure to enable it to withstand severe strain and stress. To further brace the structure, there is preferably but not necessarily, provided upon the axle an auxiliary hub 7, placed a short distance away from the main frame hub 6. Diagonally disposed brace arms 8, connect the auxiliary hub 7 with the main frame structure 4 to assist the latter structure in withstanding lateral strain. Mounted to reciprocate within the bearing sleeves are two vertically disposed shafts 9. Hinged to the lower extremities of the shafts 9, is a blade or shoe 10, adapted, when pressed downward, to engage the roadway. The blade or shoe 10, being hinged to the shafts 9 at the points 11, is capable of an oscillatory movement in a lateral direction in addition to its vertical movement in unison with the reciprocatory shafts 9. As shown in the drawing, the blade or shoe 10 is of a width substantially equal to the thickness of the tire 2, whereby when the blade is engaged with the roadway, it will extend above the point of greatest diameter of the tire upon which it abuts, as hereinafter described. The shoe or blade is preferably slightly curved upward at its forward end, as shown in Figs. 1 and 3. A spring 12 attached at one end to a lug or ear 13 upon the main frame 4 and secured at its opposite end to an arm 14, projecting from the upper edge of the shoe to a point above the pivotal connections of the shoe and shafts, tends to maintain the shoe and the shafts in their elevated positions and to return them thereto, when they have been forced downward to operative positions. The connection of the spring 12 with the arm 14 at a point above the pivotal connection of the shoe, causes the shoe to be returned to normal position whenever it is oscillated therefrom about its pivotal connections 11. The tension of the spring 12 applied in this manner, further tends to prevent undue oscillation of the shoe by the vibration of the vehicle, when the shoe is in its elevated or inoperative position.

To move the shoe downward into engagement with the roadway, there is provided a toggle link 15, pivoted at one end to a lug or ear 16 upon the main frame 4 and at their opposite end to a transverse bar 17, carried by the vertically movable shafts 9. An operating link 18 connects the toggle link 15 with a control lever, which may be either a hand operated device or a pedal as shown at 19.

At the moment that the vehicle begins to skid, the operator, by the oscillation of the controlled lever 19, operates the toggle link 15 to the position shown by dotted lines in Fig. 1, thereby reciprocating the shafts 9 in their bearings 5 and forcing the blade or shoe 10 downward into engagement with the roadway. As the blade or shoe engages the roadway, it will be oscillated by the relative sidewise movement of the vehicle, until it rests against the inner side of the tire 2, which forms an abutment for the blade or shoe as shown at the left in Fig. 2.

I am aware that heretofore, anti skid devices have been employed which embody a shoe movable into and out of engagement with the roadway. However as heretofore used, such shoes have been usually located at points removed from the wheel and are suspended upon arms carried by the axle. In such constructions the strain or stress due to the lateral movement of the vehicle is resisted entirely by the supporting arms of the shoe or blade. The comparatively long leverage afforded by the suspension arms in such prior construction, transfers the strain to the axle of the vehicle and causes the axle to be bent or broken. Furthermore to resist the stress and strain to which they are subjected, such an arm must be of large proportion in order to afford the necessary strength. This difficulty is overcome in the present construction by locating the shoe or blade in close proximity to the vehicle wheel and hinging it to its support, whereby the lateral movement of the vehicle will cause the blade or shoe to abut upon the tire of the wheel. By this construction the leverage afforded by this device will be very short and the strain will be received by the wheel and not by the axle. While one shoe is forced downward into engagement with the surface of the roadway and at the same time oscillated laterally into engagement with the tire of the wheel, as shown at the left in Fig. 2, the other shoe at the right in Fig. 2 is oscillated inward and drags upon the surface of the roadway without engaging therewith.

In Fig. 3 there is shown a modification of the construction heretofore described, in which the blade or shoe 10 is supported upon swinging arms or links 20, pivoted at their upper extremities to oppositely disposed arms 21, carried by a hub 22 mounted upon the axle 3. The shoe 10 is pivotally connected to the swinging arms 20 at the points 24, whereby the shoe will be carried through a parallel movement to and from the roadway upon the oscillation of the links 20. The shoe is further pivoted or hinged at the points 25, whereby the shoe will be permitted an oscillatory movement in a lateral direction independent of the swinging movement of the links 20. A spring 26 tends to oscillate the swinging arms or links 20 rearward to elevate the shoe out of contact with the roadway. An operating link 27, connected at its forward end to a suitable control lever, not shown in the drawings, serves to oscillate the swinging arms or links 20 against the tension of the spring 26 to depress the shoe into engagement with the roadway. This device is mounted in close proximity to the wheel as heretofore described and when in operative position the shoe 10 abuts upon the tire 2 of the wheel in the same manner as the constructions shown in Figs. 1 and 2. In order to secure the double pivotal connection of the blade or shoe, a knuckle 28 is provided, which is pivotally connected with the links 20 and the blade or shoe, the connection with the respective parts being at right angles, one with the other.

From the above description it will be apparent that there has thus been provided a device of the character described, possessing the particular features of advantage before enumerated as desirable, but which obviously is susceptible of modification in its form, proportion, detail construction or arrangements of parts, without departing from the principle involved or sacrificing any of its advantages.

While in order to comply with the statute, the invention has been described in language more or less specific as to certain structural features it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. An anti skid device for vehicles comprising a pivoted plate movable into and out of engagement with a supporting member of the vehicle about an axis alined with the path of travel, and a movable support to which the plate is pivoted for independent lateral movement, by the movement of which the plate is adjusted to and from the roadway, the construction and arrangement being such that the plate will simultaneously engage the roadway and abut upon supporting member of the vehicle when in operative position.

2. An anti skid device for vehicles comprising a plate, a carrier therefor movable to and from the roadway in a plane substantially parallel with the path of travel of the vehicle, said plate being capable of movement laterally into and out of engagement with the supporting member of the vehicle independent of the movement of said carrier.

3. An anti skid device for vehicles comprising a carrier member capable of vertical movement in a plane parallel with the paths of travel of the vehicle and a road engaging member thereby capable of lateral movement, in a direction transverse to the path of travel, said engaging member being movable into and out of engagement with the roadway by the movement of the carrier member and into and out of engagement with the vehicle supporting member independent of the movement of the carrier member by its lateral movement.

4. An anti skid device for vehicles comprising a pivoted plate adapted to engage the roadway having its axis of oscillation alined with the path of travel of the vehicle, and a movable support to which the plate is pivoted, said plate being so located in relation with the vehicle supporting member that its outward oscillation will be limited by its engagement therewith.

5. An anti skid device for vehicles comprising a vertically movable pivoted plate having its axis of oscillation alined with the direction of travel, adapted to engage the roadway adjacent to the supporting member of the vehicle and at the side thereof toward which the vehicle is skidding, means for lifting the plate out of engagement with the roadway independent of its swinging movement about its axis of oscillation, the construction and arrangement being such that the vehicle and shoe are capable of sufficient independent lateral movement whereby the skidding of the vehicle will bring the supporting member thereof into lateral contact with the plate by which the skidding movement will be arrested.

6. In an anti skid device for vehicles, an oscillatory brake shoe adapted to engage the roadway and capable of movement thereto and from, having its axis of oscillation alined with the direction of travel, a toggle link adapted by its approach to alinement to force the shoe into engagement with the roadway and means for oscillating the toggle links at the will of the driver, substantially as specified.

7. In an anti skid device for vehicles, a brake shoe capable of movement to and from the roadway, said shoe being hinged for lateral oscillation in addition to its movement to and from the roadway, and a retracting spring engaged with an extension of the shoe projecting beyond the pivotal connection thereof, adapted by its retraction to return the shoe to its normal position when oscillated therefrom and to elevate the shoe out of engagement with the roadway, substantially as specified.

8. In an anti skid device for vehicles, a guide frame carried by the vehicle, a shoe support vertically movable in the guide frame, a brake shoe vertically movable in unison with the support and hinged thereto for lateral oscillation independent of its vertical movement, a toggle link connected with the shoe support to shift said support in the guide frame, and means controlled by the driver for oscillating the toggle link, said shoe being adapted by its oscillatory movement to abut upon the wheel when in operative engagement with the roadway, substantially as specified.

9. An anti skidding device for vehicles comprising a road engaging member capable of movement in a direction transverse to the path of travel of the vehicle and a movable member therefor in unison with which the road engaging member is capable of further movement to and from the roadway independent of its transverse movement and means for manually controlling the movement of the carrier member to and from the roadway, said road engaging member being actuated in its transverse movement wholly by its engagement with the roadway.

In testimony whereof, I have hereunto set my hand this 30th day of January, 1913.

DANIEL W. GETTER.

Witnesses:
ALFRED MCCRAY,
BESS CROASMUN.